(12) United States Patent
Mipo et al.

(10) Patent No.: US 9,356,498 B2
(45) Date of Patent: May 31, 2016

(54) ROTARY ELECTRIC MACHINE WITH ARMATURE MAGNETIC REACTION COMPENSATION

(75) Inventors: Jean-Claude Mipo, Creteil (FR); Li Li, Viroflay (FR); Luc Kobylanski, Paris (FR); Albert Foggia, Grenoble (FR)

(73) Assignee: Valeo Equipements Electriques Moteur (FR)

( * ) Notice: Subject to any disclaimer, the term of this patent is extended or adjusted under 35 U.S.C. 154(b) by 684 days.

(21) Appl. No.: 13/266,339

(22) PCT Filed: Mar. 8, 2010

(86) PCT No.: PCT/FR2010/050393
§ 371 (c)(1),
(2), (4) Date: Jun. 14, 2012

(87) PCT Pub. No.: WO2010/125262
PCT Pub. Date: Nov. 4, 2010

(65) Prior Publication Data
US 2012/0248921 A1    Oct. 4, 2012

(30) Foreign Application Priority Data
Apr. 29, 2009   (FR) ...................... 09 52804

(51) Int. Cl.
*H02K 21/04*   (2006.01)
*H02K 23/02*   (2006.01)
(Continued)

(52) U.S. Cl.
CPC .............. *H02K 23/02* (2013.01); *H02K 21/04* (2013.01); *H02K 23/04* (2013.01); *H02K 23/22* (2013.01)

(58) Field of Classification Search
CPC ........ H02K 21/04; H02K 23/02; H02K 23/04; H02K 23/22
USPC ................ 310/51, 156.07, 181, 216.099, 263
IPC ....................................................... H02K 21/04
See application file for complete search history.

(56) References Cited

U.S. PATENT DOCUMENTS

| 4,117,360 A | * | 9/1978 | Richter ................ H02K 1/2773 310/156.55 |
| 5,132,581 A | * | 7/1992 | Kusase ................... H02K 1/243 310/181 |
| 5,444,318 A |   | 8/1995 | Stumpf |

(Continued)

FOREIGN PATENT DOCUMENTS

| EP | 0 673 105 | 9/1995 |
| EP | 1 443 631 | 8/2004 |

(Continued)

OTHER PUBLICATIONS

McPherson, George, Jr., "Armature reaction", Department of Electrical Engineering, School of Engineering, University of Missouri, Columbia, Missouri, 2014.*

*Primary Examiner* — John K Kim
(74) *Attorney, Agent, or Firm* — Berenato & White, LLC (57) ABSTRACT

A rotary electrical machine comprises a rotor including a plurality of poles and a plurality of windings (E0-E7) wound about the poles, a stator, and a compensation device configured to compensate the armature magnetic reaction of the stator. The compensation device comprises at least one permanent compensation magnet which is implanted in a pole(s) of the rotor. The magnet(s) is/are sized and placed in accord with the desired compensation effect desired.

10 Claims, 6 Drawing Sheets

(51) Int. Cl.
*H02K 23/04* (2006.01)
*H02K 23/22* (2006.01)

(56) References Cited

U.S. PATENT DOCUMENTS

| | | | |
|---|---|---|---|
| 5,663,605 A * | 9/1997 | Evans et al. .................. | 310/181 |
| 6,800,977 B1 * | 10/2004 | Ostovic .................... | 310/156.38 |
| 2003/0076004 A1 * | 4/2003 | Kusase ............... | H02K 21/8044 |
| | | | 310/263 |
| 2004/0113506 A1 * | 6/2004 | Okubo .................. | H02K 29/03 |
| | | | 310/156.43 |
| 2007/0090713 A1 * | 4/2007 | Arita ................... | H02K 21/042 |
| | | | 310/181 |
| 2008/0079375 A1 * | 4/2008 | Seguchi ............... | H02K 21/042 |
| | | | 318/139 |
| 2008/0129129 A1 * | 6/2008 | Kori et al. ...................... | 310/58 |
| 2010/0013340 A1 * | 1/2010 | Brown ................ | H02K 21/046 |
| | | | 310/181 |
| 2010/0231181 A1 * | 9/2010 | Xu .......................... | F02B 63/04 |
| | | | 322/87 |
| 2012/0248921 A1 * | 10/2012 | Mipo et al. .................... | 310/181 |

FOREIGN PATENT DOCUMENTS

| | | |
|---|---|---|
| FR | 2 371 082 | 6/1978 |
| FR | 2 379 933 | 9/1978 |
| FR | 2 414 264 | 8/1979 |
| GB | 2 028 598 | 3/1980 |
| GB | 2 241 119 | 8/1991 |

\* cited by examiner

ROTARY ELECTRIC MACHINE WITH ARMATURE MAGNETIC REACTION COMPENSATION

CROSS-REFERENCE TO RELATED APPLICATIONS AND CLAIM TO PRIORITY

This application relates to International Application No. PCT/FR2010/050939 filed Mar. 8, 2010 and French Patent Application No. 09/52804 filed Apr. 29, 2009, of which the disclosures are incorporated herein by reference and to which priority is claimed.

FIELD OF THE INVENTION

The present invention relates to a rotary electrical machine such as an alternator, a starter, or an alternator-starter for a motor vehicle. More particularly, the invention relates to a rotary electrical machine which is equipped with means for compensation for the armature magnetic reaction.

BACKGROUND OF THE INVENTION

The phenomenon of the armature magnetic reaction is known to persons skilled in the art. The armature magnetic reaction occurs when a current is circulating in the armature of the rotary electrical machine.

Taking as an example an alternator for a motor vehicle in which the armature is the stator of the machine, and the inductor is its rotor, the armature magnetic reaction occurs when the alternator is live and is discharging a current. The stator coils in which a current is circulating then produce a so-called armature reaction magnetic field, which can give rise to saturation and downgrade the magnetic field of the inductor. Subsequently, the electromagnetic force emf) is distorted (with possible saturation), and the performance of the alternator, in particular in terms of output, is adversely affected. This distortion of the emf produces harmonics which give rise to an increase in the Joule losses and iron losses of the machine. In addition, the performance relating to the acoustic vibrations and electromagnetic compatibility can also be affected by the inductor reaction.

In the field of rotary electrical machines with a high power level, it is known in the prior art to provide so-called armature reaction compensation auxiliary coils. These coils, which are included in the stator of the machine, produce a compensation magnetic field which opposes the armature reaction magnetic field, such as to reduce the effects.

The above-described solution can provide satisfactory compensation for the armature magnetic reaction in a rotary electrical machine, but it is unsuitable for the motor vehicle field, in which the constraints of weight, compactness and cost are extremely strict.

It is therefore desirable to propose a solution for compensation for armature magnetic reaction which is designed for the rotary electrical machines which are used in motor vehicles.

SUMMARY OF THE INVENTION

According to a first aspect, the present invention provides a rotary electrical machine comprising an inductor in the form of a rotor, an armature in the form of a stator, and means for compensation for the armature magnetic reaction. According to the invention, the means for compensation for the armature magnetic reaction comprise at least one permanent compensation magnet which is implanted in a pole of the inductor.

According to a particular characteristic, the means for compensation for the armature magnetic reaction comprise a permanent compensation magnet which is implanted in each of the poles of the inductor.

According to another particular characteristic, the means for compensation for the armature magnetic reaction comprise two permanent compensation magnets which are implanted in each of the poles of the inductor. Preferably, each of the two permanent compensation magnets is implanted in one half of the corresponding pole.

According to particular embodiments, a length of the permanent compensation magnet occupies approximately 30 to 45% of a half-width of the corresponding pole. In addition, the permanent compensation magnet has a residual magnetic field of between 0.8 and 1.4 Tesla, it is positioned at a distance of between approximately 2 to 6 mm relative to an end of the corresponding pole, it has a length of between approximately 1 and 6 mm, and a thickness of between approximately 1 and 4 mm.

According to a preferred embodiment, the permanent compensation magnet is positioned at a distance equal to 5.3 mm relative to an end of the corresponding pole, it has a length equal to 4.4 mm, and a thickness equal to 2 mm.

According to another characteristic, the rotary electrical machine according to the invention which has been described briefly above also comprises a progressive air gap. According to a particular embodiment, this progressive air gap varies between approximately 0.4 and 0.7 mm.

According to another characteristic, the permanent compensation magnet of the rotary electrical machine according to the invention is of the surface or buried type.

BRIEF DESCRIPTION OF THE DRAWINGS

Other characteristics and advantages of the invention will become apparent from reading the following description of one of its particular embodiments, with reference to the following figures, in which.

DETAILED DESCRIPTION

Figure 1:
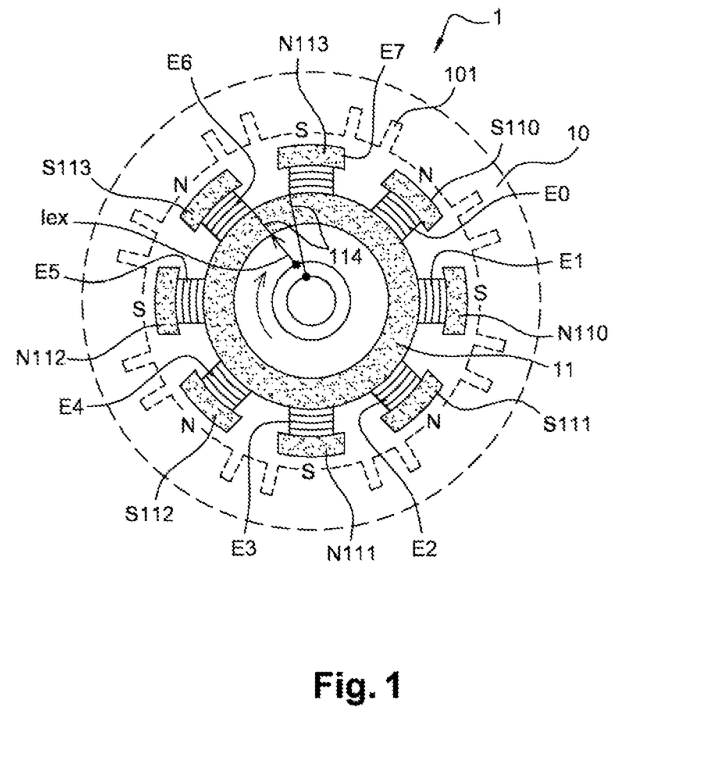
FIG. 1 shows a simplified general structure of a rotary electrical machine of the type with projecting poles.

FIG. 1 shows in simplified form the structure of a rotary electrical machine 1 of the type with projecting poles. The machine 1 comprises a stator 10 and a rotor 11, and is without current compensation means.

The stator 10 is provided with a plurality of notches 101 which are designed to receive stator coils (not shown). The rotor 11 comprises 4 pairs of poles with North (N) and South (S) polarities, consisting of poles S110, N110, S111, N111, S112, N112, S113 and N113.

An excitation coil 114, which defines a field coil generating a magnetic field, is provided in the rotor 11 of the machine 1, and comprises eight windings in series, E0 to E7, which are localized respectively at the level of the eight projecting poles of the machine 1. Each of the windings E0-E7 is wound about one of the projecting poles S110, N110, S111, N111, S112, N112, S113 and N113. An excitation current Iex supplies the excitation coil 114, such as to produce magnetic fields with the required polarities at the level of the poles S110, N110, S111, N111, S112, N112, S113 and N113.

When the machine 1 is functioning in an alternator mode and is discharging current, an armature magnetic reaction occurs which is now described with reference to FIGS. 2A, 2B and 2C. The armature magnetic reaction is a change in a magnetic field of the field coil of the rotor 11 caused by a magnetic field induced by current flowing through the stator coil of the stator 10 in the alternator mode.

Figure 2A:
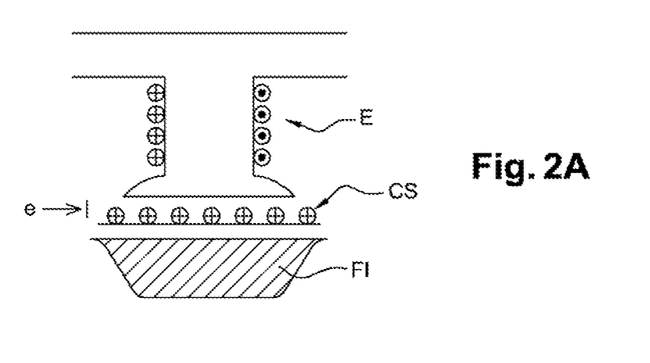
FIGS. 2A to 2C are skeleton diagrams used to explain the phenomenon of armature magnetic reaction.
Figure 2B:
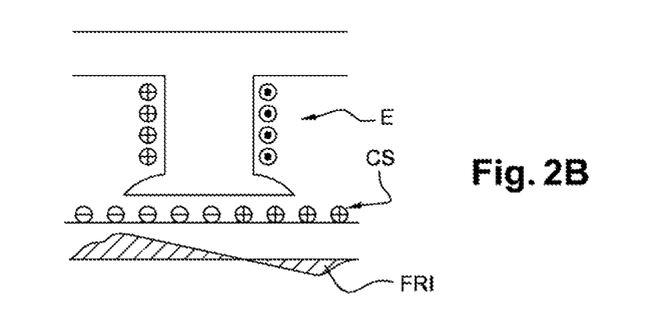
Figure 2C:
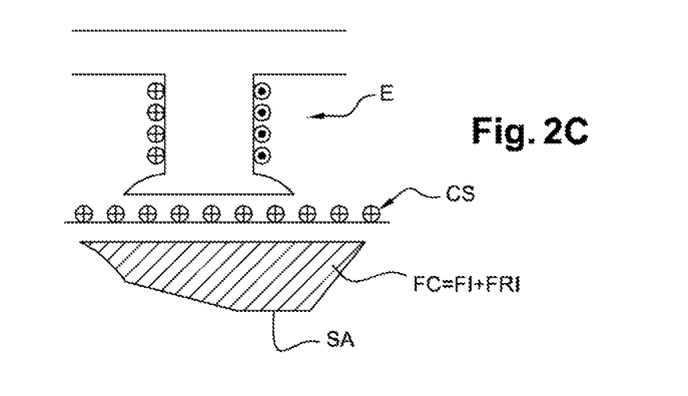

FIGS. 2A, 2B and 2C show schematically the magnetic fields in an air gap e of the machine 1, at the level of a pole N of the latter, FIGS. 2A, 2B and 2C show the pole N with an excitation winding E, as well as conductors CS of the stator coil which are accommodated in notches 101 (FIG. 1) in the stator.

FIG. 2A shows a magnetic field FI, Which is a magnetic field produced by the pole N in the air gap e when the machine 1 is functioning without charge, i.e. when no current is circulating in the stator coil. The wave form of the field FI is then substantially regular in the air gap assembly in relation to the pole N.

FIG. 2B shows the effect of the armature magnetic reaction in the form of a field FRI, Which is an armature reaction magnetic field produced by the conductors CS of the stator coil, when a charge current is circulating in the conductors. As shown in FIG. 2B, the field FRI comprises positive alternation and negative alternation.

FIG. 2C shows a field FC which is a resultant magnetic field present in the air gap e when the machine is discharging a charge current. The field FC is the sum of the fields FI and FRI. As shown in FIG. 2C, the field FC is significantly deformed and dephased in comparison with the field FI produced when the machine 1 is functioning without charge. In addition, saturation of the magnetic current (cf. reference SA in FIG. 2C) may occur as a result of this armature magnetic reaction. Saturation of this type may give rise to a loss of performance.

The wave forms of the magnetic fields FI, FRI and FC shown in FIGS. 2A, 2B and 2C are theoretical curves, which are simplified for the needs of the explanation.

Figure 3:
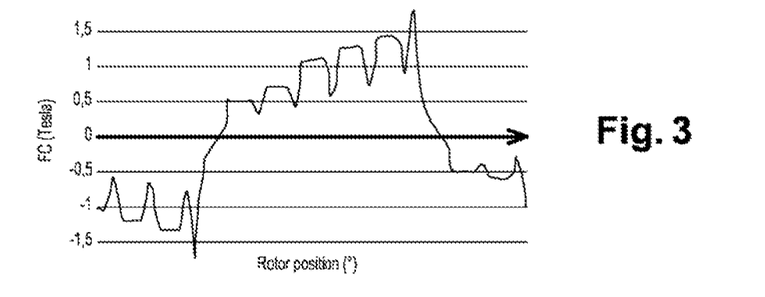
FIG. 3 is a real measurement curve of the magnetic field present in an air gap of the machine.

FIG. 3 shows a real measurement curve of the magnetic curve FC which is present in the air gap of a rotary electrical machine with projecting poles. The x-axis shows the angular position of the rotor of the machine, and the y-axis shows the Tesla value corresponding to the magnetic field FC. The wave form of the field FC comprises peaks which are essentially caused by the presence of the notches in the stator. A wave form of this type comprises many harmonics which downgrade the performance of the rotary electrical machine.

According to the present invention, means are incorporated in the poles of the rotor of the rotary electrical machine, for compensation for magnetic reaction in the form of permanent magnets. The magnetic flow which is produced by the permanent magnet then opposes that of the armature magnetic reaction, thus decreasing the effect of the latter.

Figure 4:
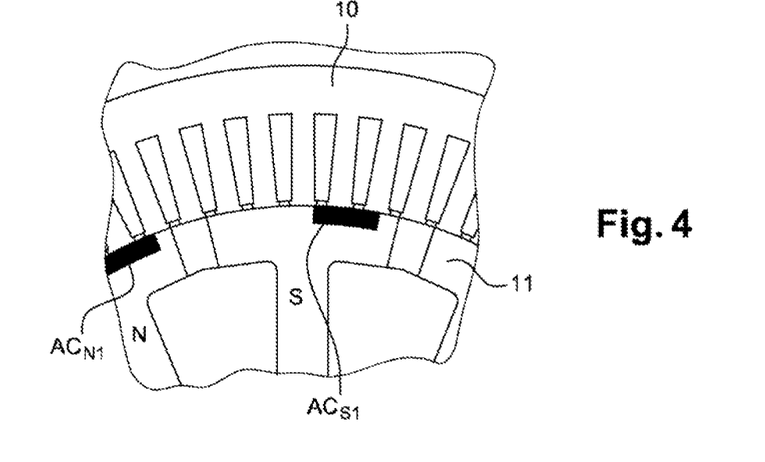
FIG. 4 is a partial view in cross-section of a rotary electrical machine according to the invention, equipped with permanent magnets for compensation for the armature magnetic reaction.

FIG. 4 shows permanent magnets $AC_{N1}$ and $AC_{S1}$ included in two successive poles of type N and S of a rotary electrical machine with projecting poles, such as the machine 1 in FIG. 1.

The permanent magnets $AC_{N1}$ and $AC_{S1}$ form part of the means for compensation for the armature magnetic reaction according to the present invention. In this embodiment, a permanent magnet AC is included in each of the poles of the rotary electrical machine, which is not necessarily the case in other applications of the invention.

Figure 5:
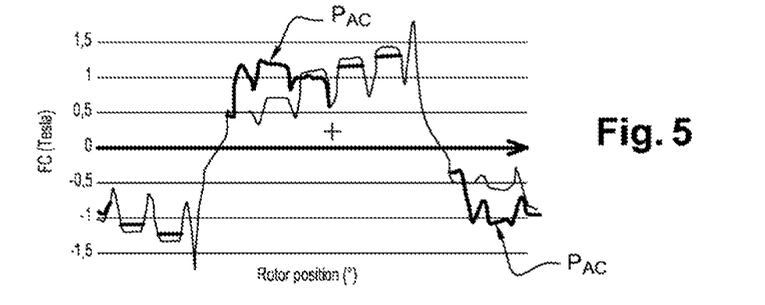
FIG. 5 is a curve for measurement of the magnetic field present in an air gap of the machine, which shows the effect of compensation for the armature magnetic reaction provided by the permanent compensation magnets.

The effect of the permanent magnets AC on the magnetic field FC in the air gap of the machine is shown in FIG. 5. The addition of the permanent magnets AC to the magnetic field FC is shown by the portions $P_{AC}$ in bold on the curve in FIG. 5. The permanent magnets AC provide compensation for the armature magnetic reaction by correcting the intensity of the magnetic field FC, as shown in FIG. 5. This correction improves the frequential spectrum of the magnetic field FC in the sense of reduction of the harmonics which affect adversely the performance of the machine.

In order to obtain the required compensation for the armature magnetic reaction, it is desirable to optimise different parameters, in particular the position of the permanent magnet AC in the pole, as well as the dimensional and residual magnetic field characteristics of the magnet.

Tests and simulations have been carried out by the inventive organisation, in particular on a rotary electrical machine for a motor vehicle with a nominal power of 40 kW, an outer diameter of 200 mm, and a length of 240 mm.

Permanent magnets AC which have a residual magnetic field of between 0.8 and 1.4 T give good results for motor vehicle applications. However, other residual magnetic field intensities could also be appropriate, depending on the applications.

Figure 6:
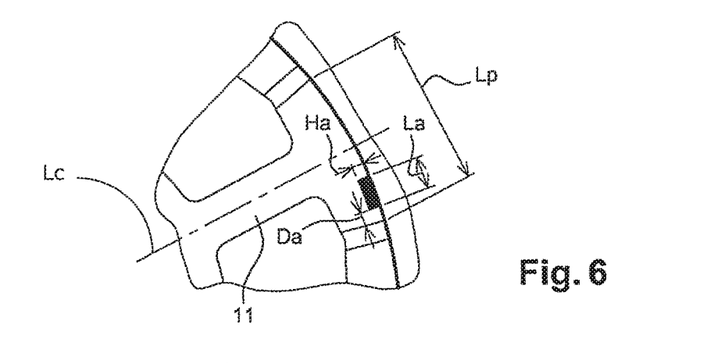
FIG. 6 is a partial view in cross-section showing the position of a permanent compensation magnet in a corresponding pole of the machine.

With reference to FIG. 6, the characteristics of dimensions and position of the magnets AC are defined by the following parameters:

La=Length of the magnet AC in the direction perpendicular to the radius of the rotor 11;

Ha=thickness of the magnet AC in the radial direction of the rotor 11;

Da=distance between the magnet AC and an end of the pole in the direction perpendicular to the radius of the rotor 11;

Lp=width of the pole in the direction perpendicular to the radius of the rotor 11.

In this embodiment with a single magnet AC per pole, the magnet AC is situated in the first half of the width ½ LP of the pole. The first half of the pole is considered in this case to be the one which corresponds to the front part of the pole, determined by the direction of rotation of the rotor of the machine. In other words, the magnet AC is offset from a center line Lc of the pole, as best shown in FIG. 6.

For the above-described rotary electrical machine for a motor vehicle, the following optimum values have been determined: La=4.4 mm and Da=5.3 mm for a thickness of magnet of Ha=2 mm.

It will be appreciated that the aforementioned optimum values are non-limiting, since, depending on the applications, different values can be determined by persons skilled in the art.

Thus, depending on the applications, the length La of the magnet AC can represent approximately 30 to 45% of the half-width ½ LP of the pole. In addition, the magnet AC can advantageously be positioned at a distance Da Which will be between approximately 2 and 6 mm. The length La of the magnet AC can be between approximately 1 and 6 mm, and the thickness Ha can be between approximately 1 and 4 mm.

Figure 7:
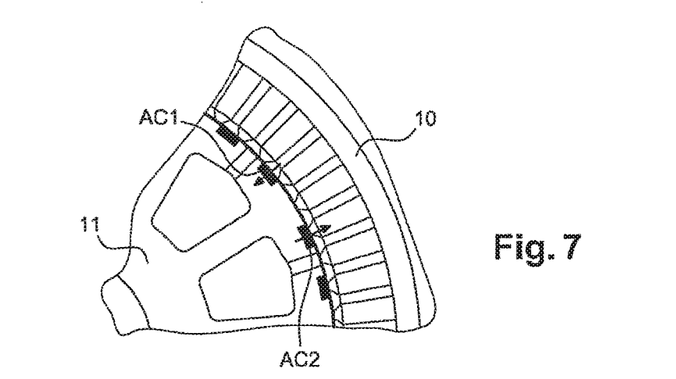
FIG. 7 is a partial view in cross-section of a rotary electrical machine according to the invention equipped with two permanent magnets for compensation for the armature magnetic reaction.

FIG. 7 shows an embodiment in which two armature magnetic reaction compensation magnets AC1 and AC2 are provided for each pole.

In this machine in FIG. 7, the magnets AC1 and AC2 have opposite polarities, and are situated in the first and second halves of the pole. With alternation of the magnetic field FC, as shown in FIG. 3, one of the magnets, for example AC1, will have the effect of increasing the intensity of the magnetic field FC in the first part of the alternation, and the other magnet, for example AC2, will have the effect of reducing the intensity in the second part of the alternation. Correction of the distortion, caused by the armature reaction, of the wave form of the magnetic field, is thus carried out such as to obtain a more regular wave form, comprising fewer harmonics. As illustrated in FIG. 7, a direction of magnetization of the magnets AC1 and AC2 extends in the radial direction of the rotor 11.

The present invention also provides the advantage of a clear improvement in the mechanical torque which is provided when the rotary electrical machine is functioning in engine mode.

Figure 8:
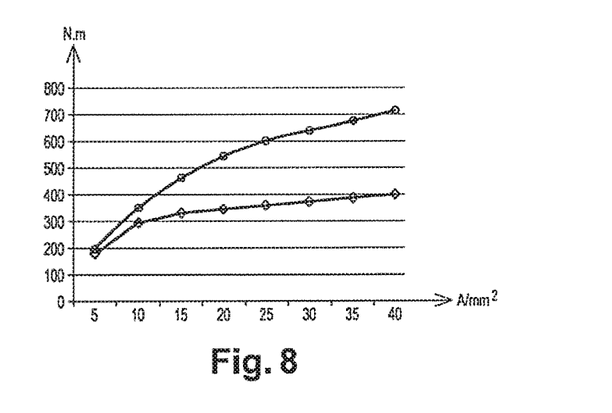
FIG. 8 shows the torque curves obtained with and without compensation magnets when the rotary electrical machine is functioning in engine mode.

FIG. 8 shows, according to the density of current in the stator, the torque provided by the aforementioned 40 kW machine functioning in engine mode at a speed of 3,000 rpm, depending on whether or not the machine is equipped with permanent magnets AC for compensation for the armature magnetic reaction.

A first curve with square points is that of the machine without the magnets AC. A second curve with round points is that of the machine with the magnets AC, and has torque values which are higher than those of the first curve.

Figure 9:
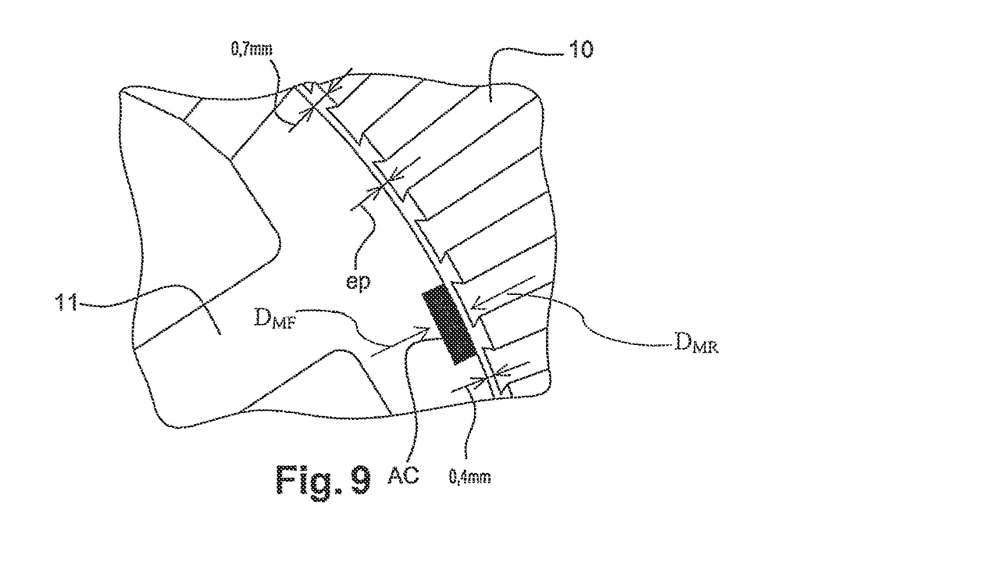
FIG. 9 is a partial view in cross-section of a rotary electrical machine according to the invention comprising a progressive air gap.
Figure 11:
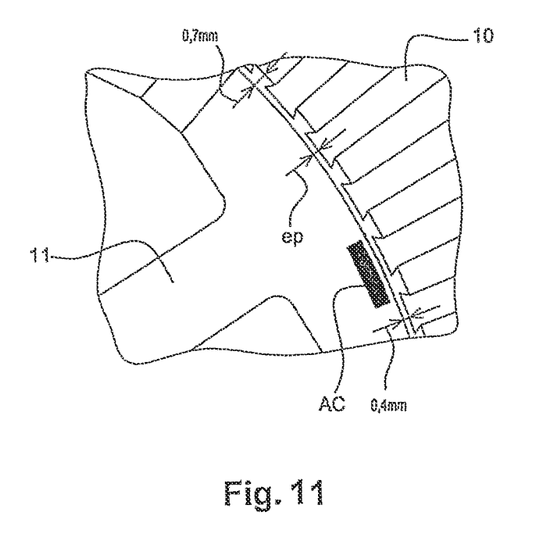
FIG. 11 is a partial cross-sectional view of the rotary electrical machine according to the invention with the permanent compensation magnet of the buried type.

The above-described embodiments comprise permanent magnets AC of the surface type, i.e. which abut the surface of the pole situated opposite the air gap, as shown in FIGS. 4 and 9. However, it will be noted that permanent magnets AC of the buried type (shown in FIG. 11) can also be used in certain applications of the invention.

According to the present invention, a progressive air gap ep, as shown in FIG. 9, can be associated with the permanent magnets AC for compensation for the armature reaction. Each of the permanent compensation magnets AC produces a magnetic flow in the direction $D_{MF}$, which is opposite to the direction $D_{MR}$ of the armature magnetic reaction of said stator.

In the embodiment in FIG. 9, the air gap ep varies in the angular direction of the rotor 11 progressive from approximately 0.4 mm to approximately 0.7 mm, from one end to the other of the pole. The surface of the pole which is opposite the air gap ep and the notches in the stator is machined so as to obtain this progressive air gap ep.

Figure 10:
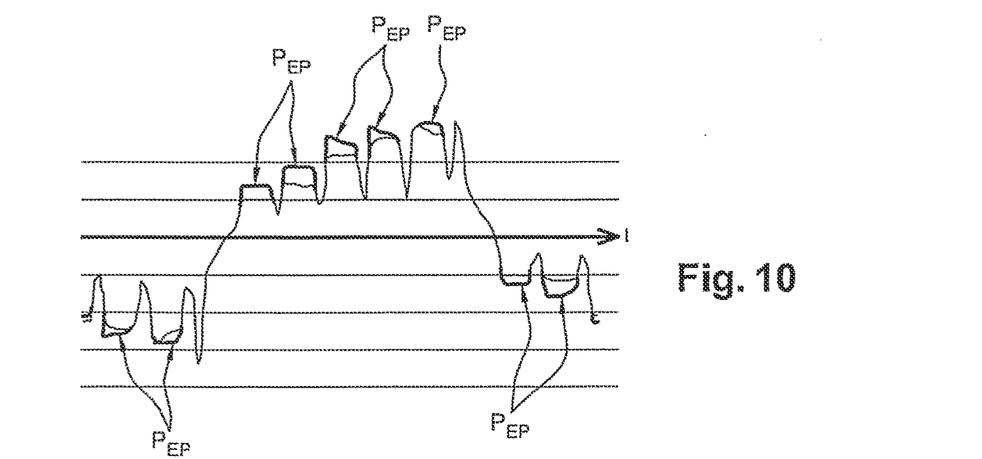
FIG. 10 is a curve for measurement of a magnetic field present in an air gap of the machine, showing the effect of compensation for the armature magnetic reaction provided by the progressive air gap of the machine in FIG. 9.

FIG. 10 shows an example of the compensation which is provided by the progressive air gap ep. The effect of the progressive air gap ep on the wave form of the magnetic field is indicated, by the portions in bold $P_{EP}$. The curve in FIG. 10 shows only the compensation effect provided by the progressive air gap ep, i.e. without the compensation magnets AC.

It will also be noted that a compensation magnet AC can be provided in a divided manner, i.e. in the form of at least two magnets which are disposed side by side, and are separated by a thin wall of magnetic material (the rotor iron). An embodiment of this type makes it possible to reduce the losses in the magnet AC.

The invention has been described herewithin the context of a particular rotary electrical machine. It should be clear that the invention will have applications in a broader field, in other words that of synchronous machines. More particularly, the invention has a significant application in rotary electrical machines with a toothed rotor, i.e. machines of the Lundell type which are very widely used in motor vehicles. It will also be noted that the invention can be used in rotors which comprise interpolar permanent magnets.

The invention claimed is:

1. A rotary electrical machine operable in an alternator mode, said rotary electrical machine comprising:
    a rotor (11) including a plurality of poles and a plurality of windings (E0-E7) wound about said poles and defining a field coil;
    a stator (10) including a stator coil; and
    a compensation device configured to compensate an armature magnetic reaction caused by a magnetic field induced by current flowing through said stator coil of said stator in said alternator mode and altering a magnetic field of said field coil of said rotor, said compensation device comprising at least one permanent compensation magnet (AC) implanted in at least one of said poles of said rotor;
    said at least one permanent compensation magnet (AC) producing magnetic flow in the direction opposite the armature magnetic reaction of said stator;
    said at least one permanent compensation magnet (AC) being offset from a center line of said at least one of said poles.

2. The machine according to claim 1, wherein said compensation device comprises a permanent compensation magnet (AC) implanted in each of the poles of said rotor; said permanent compensation magnet (AC) produces magnetic flow in the direction opposite the armature magnetic reaction of said stator.

3. The machine according to claim 1, wherein said compensation device comprises two permanent compensation magnets (AC) implanted in each of said poles of said rotor, each of said two permanent compensation magnets (AC) being implanted in one half of the corresponding pole.

4. The machine according to claim 1, further comprising a progressive air gap (ep) between said stator and said rotor in the radial direction of said machine;
    wherein said progressive air gap (ep) varies in the angular direction of the rotor from one end to the other end of each of said poles.

5. The machine according to claim 4, wherein said progressive air gap (ep) varies progressively between approximately 0.4 and approximately 0.7 mm in the angular direction from one end to the other end of each of said poles.

6. The machine according to claim 1, wherein said permanent compensation magnet (AC) is of the surface or buried type.

7. The machine according to claim 1, wherein a direction of magnetization of said permanent compensation magnet (AC) extends in the radial direction of said rotor (11).

8. A rotary electrical machine operable in an alternator mode, said rotary electrical machine comprising:
- a rotor (11) including a plurality of poles and a plurality of windings (E0-E7) wound about said poles and defining a field coil;
- a stator (10) including a stator coil; and
- a compensation device configured to compensate an armature magnetic reaction caused by a magnetic field induced by current flowing through said stator coil of said stator in said alternator mode and altering a magnetic field of said field coil of said rotor, said compensation device comprising at least one permanent compensation magnet (AC) implanted in at least one of said poles of said rotor;
- one of said poles in which said permanent compensation magnet is implanted has a width (Lp) in the direction perpendicular to the radius of said rotor (11);
- a length (La) of said permanent compensation magnet (AC) in the direction perpendicular to radius of said rotor (11) occupies approximately 30 to 45% of a half-width (½Lp) of the corresponding pole in which said permanent compensation magnet is implanted.

9. A rotary electrical machine operable in an alternator mode, said rotary electrical machine comprising:
- a rotor (11) including a plurality of poles and a plurality of windings (E0-E7) wound about said poles and defining a field coil;
- a stator (10) including a stator coil; and
- a compensation device configured to compensate an armature magnetic reaction caused by a magnetic field induced by current flowing through said stator coil of said stator in said alternator mode and altering a magnetic field of said field coil of said rotor, said compensation device comprising at least one permanent compensation magnet (AC) implanted in at least one of said poles of said rotor;
- said permanent compensation magnet (AC) having a residual magnetic field of between 0.8 and 1.4 Tesla, and positioned at a distance (Da) of between approximately 2 to 6 mm relative to an end of the corresponding pole in which it is implanted;
- said magnet having a length (La) of between approximately 1 and 6 mm and a thickness (Ha) between approximately 1 and 4 mm.

10. A rotary electrical machine operable in an alternator mode, said rotary electrical machine comprising:
- a rotor (11) including a plurality of poles and a plurality of windings (E0-E7) wound about said poles and defining a field coil;
- a stator (10) including a stator coil; and
- a compensation device configured to compensate an armature magnetic reaction caused by a magnetic field induced by current flowing through said stator coil of said stator in said alternator mode and altering a magnetic field of said field coil of said rotor, said compensation device comprising at least one permanent compensation magnet (AC) implanted in at least one of said poles of said rotor;
- said permanent compensation magnet (AC) being positioned at a distance (Da) equal to 5.3 mm relative to an end of the corresponding pole;
- said magnet having a length (La) equal to 4.4 mm and a thickness (Ha) equal to 2 mm.

* * * * *